United States Patent [19]
Verdicchio et al.

[11] Patent Number: 5,951,909
[45] Date of Patent: Sep. 14, 1999

[54] COMPOSITION FOR THE DETECTION OF ELECTROPHILIC GASES AND METHODS OF USE THEREOF

[75] Inventors: Robert J. Verdicchio, Succasunna; Stewart R. Kaiser, Hackettstown; Shawn Walsh, Branchburg, all of N.J.

[73] Assignee: R-Tec Technologies, Inc., Allamuchy, N.J.

[21] Appl. No.: 09/065,884

[22] Filed: Apr. 24, 1998

Related U.S. Application Data

[62] Division of application No. 08/837,355, Apr. 17, 1997, Pat. No. 5,783,110.

[51] Int. Cl.$^6$ .............................. C09K 5/00; G01M 3/04; G01M 3/20; B01J 13/00
[52] U.S. Cl. ............................ 252/68; 252/189; 73/40; 73/40.7; 62/125; 516/105; 516/106
[58] Field of Search .................... 516/105, 106; 73/40, 40.7; 62/125; 252/68, 194, 184, 189, 192

[56] References Cited

U.S. PATENT DOCUMENTS

| | | | |
|---|---|---|---|
| 3,370,013 | 2/1968 | Labac | 252/68 |
| 3,770,640 | 11/1973 | Bartett | 252/68 |
| 4,128,508 | 12/1978 | Munder | 424/76 |
| 4,249,412 | 2/1981 | Townsend, III | 73/40.7 |
| 4,288,402 | 9/1981 | Ellis | 422/61 |
| 4,377,554 | 3/1983 | Johnson | 422/239 |
| 4,397,944 | 8/1983 | Komurn et al. | 435/4 |
| 4,756,854 | 7/1988 | Wegrzyn | 252/408.1 |
| 4,784,959 | 11/1988 | Wegrzyn | 436/3 |
| 4,871,535 | 10/1989 | Helloff et al. | 424/71 |
| 4,976,931 | 12/1990 | Stoemer, III et al. | 422/211 |
| 5,028,792 | 7/1991 | Mullis | 250/474.1 |
| 5,149,453 | 9/1992 | Parekh | 252/68 |
| 5,373,728 | 12/1994 | Guetzler | 73/40.7 |
| 5,377,496 | 1/1995 | Otto et al. | 62/129 |
| 5,421,192 | 6/1995 | Henry | 73/40.7 |
| 5,552,074 | 9/1996 | Patron et al. | 252/67 |
| 5,560,855 | 10/1996 | Hinton et al. | 252/68 |
| 5,567,753 | 10/1996 | Shuman et al. | 524/249 |

*Primary Examiner*—Joseph D. Anthony
*Attorney, Agent, or Firm*—Omri M. Behr, Esq.

[57] ABSTRACT

There is provided a method for the detection of leaks of an electrophilic gas from a system, such as chlorodifluoromethane or carbon dioxide, which comprises applying to an exterior surface of the system a gel consisting essentially of a Lewis base capable of removing a proton from the gas or reacting therewith in a similar electrophilic manner; a dye capable of visibly indicating a color change on protonation or deprotonation; a solvent for the dye, the base and the gas; and a rheology modifier capable of producing a non-newtonian gel of all of these components which is sufficiently translucent to permit visual detection of change of color of the dye and of sufficient pseudoplasticity/thixotropy to provide adhesion to vertical and horizontal surfaces.

16 Claims, No Drawings

COMPOSITION FOR THE DETECTION OF ELECTROPHILIC GASES AND METHODS OF USE THEREOF

This application is a divisional of Ser. No. 08/837,355, filed Apr. 17, 1997 now U.S. Pat. No. 5,783,110.

FIELD OF THE INVENTION

Detection of electrophilic gases

DISCUSSION OF THE PRIOR ART

The problem of leak detection of gases, particularly refrigerant gases has long been recognized. The principle approach to its solution has been the mix an indicator into the refrigerant itself and to look for external appearance of the indicator.

Methods of detecting leakage of $ClF_2CH$ (chlorodifluoromethane) as a refrigerant based on a color change of an indicator as a result of an acid-base reaction are disclosed in U.S. Pat. No. 3,770,640 and Japan 61-97457). Organic bases such as amines have been used in the indicator compositions (U.S. Pat. Nos. 3,770,640; 1,915,965; 3,370,010; and 5,560,855). U.S. Pat. No. 1,915,965 to William describes a method of testing for leaks in a refrigerating system of the compression type. Examples are given of refrigerants which are the members of the halo-fluoro group. The property of certain basic dyes such as methylviolet base, crystal violet, auramine B, rhodamine B, etc. of permanently staining certain materials is employed.

The disadvantage of internal indicators is that they may negatively affect the efficiency of the equipment containing them. Also a substantial amount of indicator must leak out to be detected.

An external fluorescent leak detection composition comprising sodium fluorescein and a semisynthetic cellulose thickening agent is disclosed in U.S. Pat. No. 4,249,412, to Townsend, III. This patent describes the use of methyl and ethyl cellulose derivatives in such compositions. The composition is applied to a cold surface, such as refrigeration tubes. Preferred thickening agents include the semisynthetic cellulose derivatives, such as carboxymethylcellulose, hydroxymethylcellulose, methylcellulose, ethylcellulose and mixtures thereof. This method is directed to bubble detection and not to chemical interaction with the refrigerant. Furthermore, it requires the use of a light source to excite the fluorescein.

In view of the fact that certain refrigerants such as chlorodifluoromethane have been banned from future production since they have a highly deleterious environmental effect on the ozone layer, it is essential to develop an indicator system which is rapidly sensitive to the smallest leaks. Such leaks should be detectable with the naked eye.

SUMMARY OF THE INVENTION

There is provided a composition for the detection of a electrophilic gas, such as chlorodifluoromethane or carbon dioxide, which comprises a Lewis base capable of removing a proton from the gas or reacting therewith in a similar electrophilic manner; a dye capable of visibly indicating a color change on protonation or deprotonation, that is to say on pH change; a solvent for the dye, the base and the gas; and a rheology modifier capable of producing a nonnewtonian gel of all of these components which is sufficiently translucent to permit visual detection of change of color of the dye and of sufficient pseudoplasticity/thixotropy to provide adhesion to vertical and horizontal surfaces.

The Lewis base should be present in sufficient amount to bring the pH of the gel to between 6.9 and 14 and may be selected from the group consisting of alkali- and alkaline earth-metal hydroxides, alkoxides and carbonates; amines; quaternary ammonium hydroxides, alkoxyamines, and hydroxylalkylamines.

Any indicator giving a clear transition from base to acid, notably in the visible spectrum without enhancement (ie UV light) may be used.

Suitably, the solvent is selected from the group consisting of alkanols, arylalkanols, alkyl halides, alkyl ketones, alkylamines, aralkylamines, alkyl esters of alkanoic acids, dimethylsulfoxide and water.

It has been found desirable for the rheology modifier to be selected from the group consisting of hydroxyalkylcellulose, cellulosic semisynthetic polymers, polyvinyl alcohols, carbopols, alginates, natural gums, polyvinylpyrrolidone , alkyd resins and polyacrylates.

The composition is used by providing a coating of thereof on a conduit for said gas. It has also been found useful to preserve the coating by applying to it a sprayable, film forming topcoat composition settable at between about 0–about 30° C. wherein the film is sufficiently translucent to permit visual detection of change of color of the dye.

DESCRIPTION OF THE PREFERRED EMBODIMENTS

The detection method disclosed (for example for chlorodifluoromethane) utilizes the following general reaction (wherein $B^-$ is a strong anion:

$$B^- + ClF_2CH \rightarrow BH + ClCF_2^-$$

for example:

$$NaOH + ClF_2CH \rightarrow H_2O + NaClCF_2$$

or, in the case of carbon dioxide:

$$NaOH + CO_2 \rightarrow NaHCO_3$$

Detection of the reaction is made possible by using a pH sensitive organic (or inorganic) indicator, which exhibits a color change on with the decrease in $[B^-]$. A solution of an appropriate base and indicator, in an appropriate solvent, is gelled and applied to the system externally at the pipe joints. If the gas leaks, it must pass through the gel, where it reacts as above and creates the visible color change. To maintain the presence of sufficient solvent and prevent contamination of the gel, an appropriate top coat may be applied.

The compositions of the present invention for the detection of an electrophilic gas, are especially useful for use with chlorodifluoromethane or carbon dioxide.

The choice of the Lewis base is a wide one. Especially suitable as alkali- and alkaline earth-metal hydroxides, are sodium hydroxide and calcium or magnesium hydroxide, as alkoxides and carbonates, sodium ethoxide and sodium carbonate; as amines, quaternary ammonium hydroxides, alkoxyamines, and hydroxylalkylamines higher boiling members of this group or those having low vapor pressures at ambient temperatures are preferred. Especially preferred as Lewis bases are sodium hydroxide, sodium ethoxide or methoxide, ethyl hydroxylamine and triethylamine because of their low cost and ready availability.

Among the suitable dyes used as indicators (showing the appropriate color change) there may be mentioned: thymol blue (blue to yellow); phenolphthalein (pink to clear);

m-cresol purple (purple to yellow); phenol red (red to yellow); and thymolphthalein blue (blue to clear).

A wide range of solvents may be used such as alkeanols, arylalkanols, alkyl halides, alkyl ketones, alkylamines, aralkylamines, alkyl esters of alkanoic acids, dimethylsulfoxide and water. Suitably, the alkyl moieties may be straight chain-, branch chain- and cyclic-moieties and the alkanols and alkylamines may be primary, secondary and tertiary alkanols and alkylamines. Especially preferred are dimethylsulfoxide, water, tetrahydrofuran, acetone, ethyl acetate and methanol. Suitably, the solvent is utilized in a range relative to the sum of the Lewis base and the dye of between 1 and 99 parts by volume per part by weight of base plus dye.

As a protective coating or topcoat composition there are preferably employed ethylcellulose, polyethylene, polytetrafluorethylene or mixtures thereof.

Suitable solvents for the topcoat may include: aromatic hydrocarbons such as toluene, xylene, aromatic napthas, alkanes such as hexane, alkyl ketones such as methyl isobutyl ketone and acetone; straight or branched chain ($C_1$ to $C_4$)alcohols such as methanol, ethanol, isopropanol and n-butanol; $C_1$ to $C_5$ alkyl ethers; mono-, di-, and tri-glycols (Dowanols® manufactured by Dow Chemical Corp.); mineral spirits; mineral, vegetable, animal or marine oils; and\or mixtures thereof.

EXAMPLES

Example 1
Preparation of Indicator Composition

Thymolphthalein blue dye is added to dimethylsulfoxide (DMSO) to produce a 0.01M solution. There is also added 0.1 ml of FD & C #5 (Yellow) per 50 ml of total solution. Concentrated aqueous sodium hydroxide is added dropwise until the dye/DMSO solution has a pH of 11. Sufficient hydroxyethylcellulose (~3 g/100 ml DMSO) is added to achieve a blue gel.

Example 2
Application of Indicator Composition

All pipe contact joints and valves of a working air conditioning system containing chlorodiflouromethane are cleaned using methanol containing sufficient sodium hydroxide to provide a pH of ~10–11. The blue gel is then applied to all of these pipe contact joints and valves.

Example 3
Application of Top Coat Composition

The gel applied as in Example 2 above, is then spray coated with an aerosol of ethylcellulose in methanol, previously similarly adjusted to pH of 11 using dropwise addition of concentrated aqueous sodium hydroxide in methanol and the top coat thus produced is allowed to dry.

Upon release of chiorodiflouromethane, (in the ppm range of ~1–10) the blue undercoat will completely change to yellow. It should be noted that while the actual color change is blue to clear, the presence of the FD&C yellow will show as yellow. The presence of this yellow dye is not enough to change the original blue to green.

Example 4
Preparation of Another Indicator Composition

M-Cresol purple added to dimethylsulfoxide (DMSO) to produce a 0.01M solution. Concentrated aqueous sodium hydroxide is added dropwise until the dye/DMSO solution has a pH of 11. Sufficient polyvinyl alcohol (~4 g/100 ml DMSO) is added to achieve a purple gel.

Example 5
Application of Indicator Composition

All pipe contact joints and valves of a solvent extraction system containing liquid carbon dioxide are cleaned using methanol containing sufficient sodium hydroxide to provide a pH of ~10–11. The purple gel of Example 4 is then applied to all of these pipe contact joints and valves.

Example 6
Application of Top Coat Composition

The gel applied as in Example 5 above, is then spray coated with an aerosol of polyethylene in toluene, similarly previously adjusted to pH of 11 using dropwise addition of concentrated aqueous sodium hydroxide in methanol and the top coat thus produced is allowed to dry.

Upon release of carbon dioxide, (in the ppm range of ~1–10) the purple undercoat will completely change to yellow.

Example 7
Preparation of Yet Another Indicator Composition

Phenol red added to dimethylsulfoxide (DMSO) to produce a 0.01M solution. Concentrated aqueous sodium hydroxide is added dropwise until the dye/DMSO solution has a pH of 11. Sufficient sodium alginate (~5 g/100 ml DMSO) is added to achieve a red gel.

Example 8
Application of Indicator Composition

All pipe contact joints and valves of a working air conditioning system containing chlorodiflouromethane are cleaned using methanol containing sufficient sodium hydroxide to provide a pH of ~10–11. The red gel of Example 7 is then applied to all of these pipe contact joints and valves.

Example 9
Application of Top Coat Composition

The gel applied as in Example 8 above, is then spray coated with an aerosol of polytetrafluorethylene in toluene/methyl isobutyl ketone (solvent component ratio: 1:1), similarly adjusted to pH of 11 using dropwise addition of concentrated aqueous sodium hydroxide in methanol and the top coat thus produced is allowed to dry.

Upon release of chlorodiflouromethane, (in the ppm range of ~1–10) the red undercoat will completely change to yellow.

Example 10

In accordance with the procedures of Examples 1–9 above, but where in place of the indicator, solvent, Lewis base, rheology modifier or topcoat utilized in those examples, there are utilized any of the other members of those groups listed hereinabove, a similar result is obtained, provided of course that different indicators will show different color transformations.

We claim:

1. A method for the detection of leaks of an electrophilic gas from a system containing the same, comprising the steps of applying to the exterior of said system, a coating of a gel consisting essentially of
   a) a Lewis base capable of removing a proton from said gas,
   b) a dye molecule capable of visibly indicating a color change on protonation or deprotonation,
   c) a solvent for said dye, said base and said gas, said solvent selected from the group consisting of alkanols, arylalkanols, alkyl halides, alkyl ketons, alkylamines, aralkyamines, alkyl esters of alkanoic acids, dimethylsulfoxide, and mixtures thereof, d) a rheology modifier capable of producing a non-newtonian gel of components (a)+(b)+(c)+(d) which is sufficiently translucent to permit the visible detection of change of color of (b) and a sufficient pseudoplasticity/thixotropy to provide adhesion to vertical and horizontal surfaces, and observing the change in color of said coating upon the occurrence of a leak of said gas.

2. The method of claim 1 wherein the Lewis base is present in sufficient amount to bring the pH of the gel to between 6.9 and 14.

3. The method of claim 1 wherein the Lewis base is selected from the group consisting of alkali- and alkaline earth-metal hydroxides, alkoxides and carbonates; amines; quaternary ammonium hydroxides, alkoxyamines, and hydroxylalkylamines.

4. The method of claim 1 wherein the alkyl moieties are selected from the group consisting of straight chain-, branch chain- and cyclic-moieties.

5. The method of claim 1 wherein the alkanols and alkylamines are selected from the group consisting of primary, secondary and tertiary alkanols and alkylamines.

6. The method of claim 1 wherein the solvent is selected from the group consisting of dimethylsulfoxide, tetrahydrofuran, acetone, ethyl acetate and methanol.

7. The method of claim 1 wherein the solvent is dimethylsulfoxide.

8. The method of claim 1 wherein the Lewis base is sodium hydroxide.

9. The method of claim 1 wherein the solvent is utilized in a range relative to the sum of (a) and (b) of between 1 and 99 parts by volume per part by weight of (a)+(b).

10. The method of claim 1 wherein the rheology modifier is selected from the group consisting of hydroxyalkylcellulose, cellulosic semisynthetic polymers, polyvinyl alcohols, carbopols, alginates and natural gums.

11. The method of claim 1 wherein the rheology modifier is selected from the group consisting of hydroxyalkylcellulose, polyvinyl alcohol and sodium alginate.

12. The method of claim 1 comprising sodium hydroxide, dimethyl sulfoxide, a rheology modifier selected from the group consisting of hydroxyalkylcellulose, polyvinyl alcohol and sodium alginate and a dye molecule capable of visibly indicating a color change on protonation or deprotonation.

13. The method of claim 1 additionally comprising spraying a sprayable, film forming topcoat solution settable at between about 0° C. to about 30° C. wherein the film is sufficiently translucent to permit visual detection of change of color of (b) onto said coating.

14. The method of claim 13 wherein the topcoat solution comprises a solvent and a member selected from the group consisting of ethylcellulose, polyethylene, polytetrafluoroethylene and mixtures thereof.

15. The method of claim 14 wherein the solvent is selected from the group consisting of aromatic hydrocarbons, alkanes; alkyl ketones; straight or branch chain alkanols; $C_1$–$C_5$ alkyl ethers; mono, di and tri glycols; mineral spirits; mineral, vegetable, animal and marine oils; and mixtures thereof.

16. The method of claim 14 wherein the solvent is selected from the group consisting of xylene, toluene, hexane, methyl isobutyl ketone, acetone, methanol, ethanol, isopropanol, and n-butanol.

* * * * *